Patented Apr. 5, 1949

2,466,657

UNITED STATES PATENT OFFICE 2,466,657

MANUFACTURE OF 3-CHLOROCOUMARIN

James C. Heath and Samuel Z. Cardon, Cleveland, and Harold S. Halbedel, Euclid, Ohio, assignors to The Harshaw Chemical Company, Elyria, Ohio, a corporation of Ohio No Drawing. Application December 20, 1947, Serial No. 793,042

5 Claims. (Cl. 260—344.6)

This invention relates to the preparation of 3-chlorocoumarin and especially to a process resulting in improvement in yields thereof.

We are aware that prior to our invention 3-chlorocoumarin has been prepared and accordingly we do not claim the compound itself but only our novel method of preparation. Perkin (J. Chem. Soc.) London (abstracts) 24:43 (1871) prepared 3-chlorocoumarin by first passing chlorine into a chloroform solution of coumarin whereby to obtain coumarin dichloride. The coumarin dichloride was then treated with alcoholic potash whereby 3-chlorocoumarin was obtained.

On duplication of Perkin's process we have consistently obtained yields in the order of 40% of theoretical. Changes in temperature, use of $I_2$, $SbCl_5$ and ultraviolet light as catalyst and such variations failed to improve the yield.

We have now discovered that by passing chlorine into a solution of coumarin in carbon tetrachloride at from 60° C. to 125° C., we are able to obtain a nearly theoretical yield of coumarin dichloride. Pressure is preferably such that the selected temperature within the above limits is the reflux temperature of the solution. We then introduce the resulting coumarin dichloride into a mixture of water and a dehydrochlorinating agent which may be sodium bicarbonate, sodium carbonate, sodium sesquicarbonate, or ammonium hydroxide. Preferably the $CCl_4$ is distilled off before the coumarin dichloride is treated with the dehydrochlorinating agent. Hydrogen chloride is split out due to the action of the alkali to form alkali chloride and 3-chlorocoumarin remains. Some side reactions do occur but we obtain a greatly improved yield amounting to from 74% to 78% of theoretical.

In the practice of the invention, we may dissolve 146 parts of coumarin by weight in from 1000 to 1500 parts by weight of carbon tetrachloride and then pass in $Cl_2$ until the reaction is complete or nearly so. This may require from 1½ to 3 times the theoretical weight of $Cl_2$, that is from 107 to 213 parts by weight of $Cl_2$ per 146 parts of coumarin. The time required may be from 2 to 4 hours. After distilling off the $CCl_4$, the remaining oil is added to a mixture of water and the dehydrochlorinating agent containing from 750 to 1100 parts of water for each 146 parts of coumarin in the initial mixture and from 80 to 90 parts by weight of $NaHCO_3$ or a molecularly equivalent weight of the dehydrochlorinating agents mentioned above other than $NaHCO_3$ for each 146 parts of coumarin initially employed. Such mixture is then heated to a temperature of from 80° C. to 100° C., preferably from 90° C. to 95° C. with agitation. When the crystals produced no longer have an oily feel when passed between the fingers, the crystals are washed with water and methanol and dried.

The following examples from actual practice will serve to illustrate the invention.

Example I

First, 146 parts by weight of coumarin were dissolved in 1314 parts by weight of carbon tetrachloride. Chlorine was next passed into the solution at the rate of 68 parts by weight of $Cl_2$ per hour for a period of 2½ hours at a temperature of 72° C. The $CCl_4$ was then distilled off and the resulting oil consisting almost entirely of coumarin dichloride was added to a solution containing 1000 parts of water and 84 parts of $NaHCO_3$. The resulting mixture was then heated to 90° C. with rapid agitation and held at that temperature while agitation was continued for a period of 1½ hours. The resulting crystals were then washed with water and methanol and dried. The yield was 140 parts by weight of 3-chlorocoumarin, M. P. 121°–122.5° C. This yield calculated to 77.5% of theoretical.

Example II

The procedure of Example I was followed except that 64 parts of $Na_2CO_3$ were used as the dehydrochlorinating agent. The yield was 75.5% of theoretical.

Example III

The procedure of Example I was followed except that 76 parts of $Na_3H(CO_3)_2$ were used as the dehydrochlorinating agent. The yield was 75% of theoretical.

Example IV

The procedure of Example I was followed except that 70 parts of 30% by weight $NH_4OH$ were used as the dehydrochlorinating agent. The yield was 76% of theoretical.

Having thus described our invention, what we claim is:

1. Method of preparing 3-chlorocoumarin comprising passing $Cl_2$ gas into a $CCl_4$ solution of coumarin between temperature limits from 60° C. to 125° C. whereby to produce coumarin dichloride and dehydrochlorinating the coumarin dichloride by contacting it with an aqueous solution of an alkaline material of the class consisting of $NaHCO_3$, $Na_2CO_3$, $Na_3H(CO_3)_2$, and $NH_4OH$ between temperature limits from 80° to 100° C.

and separating the resulting 3-chlorocoumarin from said solution of alkaline material.

2. Method of preparing 3-chlorocoumarin comprising passing $Cl_2$ gas into a $CCl_4$ solution of coumarin between temperature limits from 60° C. to 125° C. whereby to produce coumarin dichloride, distilling off the $CCl_4$ and dehydrochlorinating the coumarin dichloride by contacting it with an aqueous solution of an alkaline material of the class consisting of $NaHCO_3$, $Na_3H(CO_3)_2$, and $NH_4OH$ between temperature limits from 80° C. to 100° C. and separating the resulting 3-chlorocoumarin from said solution of alkaline material.

3. Method of preparing 3-chlorocoumarin comprising passing $Cl_2$ gas into a $CCl_4$ solution of coumarin between temperature limits from 60° C. to 125° C. whereby to produce a high yield of coumarin dichloride, distilling off the $CCl_4$ and dehydrochlorinating the resulting oil by contacting it with a solution of $NaHCO_3$ in water, said last mentioned solution containing from 80 to 90 grams per liter of $NaHCO_3$ and being maintained between temperature limits from 80° C. to 100° C. and separating the resulting 3-chlorocoumarin crystals from said last mentioned solution.

4. Method of preparing 3-chlorocoumarin comprising passing $Cl_2$ gas into a $CCl_4$ solution of coumarin between temperature limits from 60° C. to 125° C. whereby to produce a high yield of coumarin dichloride, distilling off the $CCl_4$ and dehydrochlorinating the resulting oil by contacting it with a solution of $Na_2CO_3$ in water, said last mentioned solution containing from 80 to 90 grams per liter of $Na_2CO_3$ and being maintained between temperature limits from 80° C. to 100° C. and separating the resulting 3-chlorocoumarin crystals from said last mentioned solution.

5. Method of preparing 3-chlorocouramin comprising passing $Cl_2$ gas into a $CCl_4$ solution of coumarin between temperature limits from 60° C. to 125° C. whereby to produce a high yield of coumarin dichloride, distilling off the $CCl_4$ and dehydrochlorinating the resulting oil by contacting it with a solution of $NH_4OH$ in water, said last mentioned solution containing from 25 to 30 grams per liter of $NH_4OH$ and being maintained between temperature limits from 80° C. to 100° C. and separating the resulting 3-chlorocoumarin crystals from said last mentioned solution.

JAMES C. HEATH.
SAMUEL Z. CARDON.
HAROLD S. HALBEDEL.

REFERENCES CITED

The following references are of record in the file of this patent:

FOREIGN PATENTS

| Number | Country | Date |
|---|---|---|
| 511,861 | Great Britain | Aug. 25, 1939 |